Oct. 8, 1940.   H. M. CARTER ET AL   2,217,307
POWDER BOX
Filed Feb. 16, 1937

INVENTORS
Horace M. Carter
Walter Langer
BY
Kenyon & Kenyon
ATTORNEYS.

Patented Oct. 8, 1940

2,217,307

UNITED STATES PATENT OFFICE 2,217,307

POWDER BOX

Horace M. Carter and Walter Langer, New York, N. Y.

Application February 16, 1937, Serial No. 125,952

7 Claims. (Cl. 229—6)

This invention relates to powder boxes. It relates particularly to powder boxes of the type having longitudinally slidable telescoping walls.

Powder boxes have been commonly made heretofore which are usually cylindrical in shape and comprise a container part and a cover part. The container part and cover part have longitudinally slidable telescoping walls which are normally made so as to fit relatively snugly with respect to each other and thereby prevent the escape of powder from the box. Such powder boxes, while extensively manufactured, nevertheless have serious defects. Upon removing the cover from a box of this character, a partial vacuum is created in the box which increases as the cover is withdrawn and which is especially great when attempt is made to remove the cover quickly. As soon as the lower end of the side wall of the cover reaches the upper end of the side wall of the container, the vacuum is suddenly released causing a rapid inrush of air which disturbs the powder and causes it to fly about with resultant annoyance as the powder tends to get on clothing, mirror surfaces, the bureau top, etc. When the cover is replaced on the powder box, the air which is entrapped therein has to escape. While the sliding contact between the side wall of the cover and container may be quite snug, the compression of the air within the box perforce must create an exit through which the air rushes. This rushing air tends to carry powder with it which flies out of the box with the undesirable and annoying results above mentioned. Moreover, a serious waste of powder results from the repeated escape of powder from the box.

It is a purpose of this invention to overcome defects of the character aforesaid and to afford a new type of powder box from which the unintentional escape of powder is minimized and which can be produced economically.

It is a feature of this invention that a filtering medium is introduced into the structure of the powder box in such position that it entangles powder thereon which might otherwise escape from the box. This filtering medium is positioned in a passage which communicates between the interior and exterior of the box and affords a filtering vent that not only prevents escape of powder but also prevents the building up of either a vacuum or a state of compression within the box. Moreover, by providing a vent with a filtering medium therein for the inlet and outlet of air during the removal of the cover from the box and the closing of the cover on the box, the tendency of air carrying powder to escape except through the filtering vent is greatly minimized.

Further purposes, features and advantages of this invention will be apparent from the following description of certain illustrative embodiments of this invention shown in the accompanying drawing, wherein.

Figure 1:
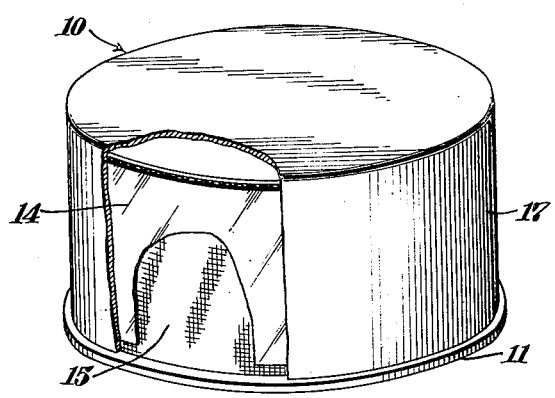
Figure 1 is a perspective view of one form of powder box embodying this invention.
Figure 2:
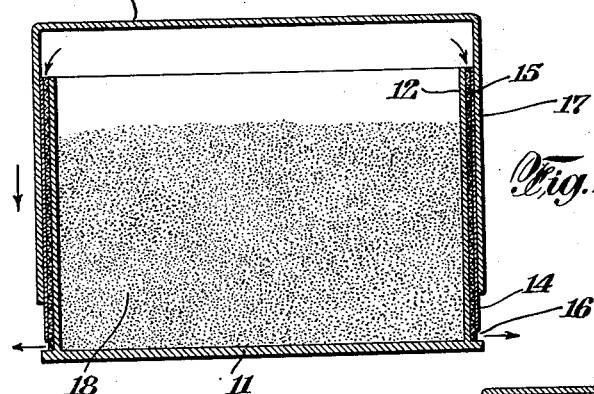
Figure 2 is a side cross-sectional view of the powder box shown in Fig. 1.

Referring to Figs. 1 and 2, a powder box embodying this invention is indicated generally by the reference character 10. The powder box includes a container part 11. The powder box also includes the cover 13. The side walls of the container and cover are longitudinally slidable so as to telescope one within the other. The side wall of the container 11 is composite in structure and includes an inner imperforate layer 12 of sheet material and an outer imperforate layer 14 of sheet material which is spaced from the inner layer 12 by a porous filtering medium 15. The filtering medium 15 may be made of any suitable material such as a soft porous felt or a woven fabric of open weave having a multiplicity of loosely disposed fibers which are adapted to entangle powder thereon while permitting the movement of air therethrough. The layer 14 in the embodiment shown in Fig. 2 terminates adjacent the bottom of the container so as to leave a small space 16 between the lower end of the layer 14 and the bottom of the container 11. As shown in the drawing, the filtering medium 15 is in communication with the interior of the box when the cover is on the box. In this way, the space between the layer 12 and the layer 14 affords passage means communicating between the interior and the exterior of the box, which passage means contains a filtering medium adapted to entangle powder thereon while permitting the movement of air therethrough. The side wall 17 of the cover 13 is in longitudinal slidable telescoping contact with the exterior of layer 14. Preferably, the interior of side wall 14 fits as snugly upon the exterior of the layer 14 as convenience in the removal of the cover 13 will permit. A small amount of some suitable adhesive, such as glue, can be used to unite the faces of the filtering medium with the layers 12 and 14, although the adhesive should penetrate the filtering medium to as slight an extent as possible so as to obstruct as little as possible the movement of air therethrough.

From the foregoing description of the embodiment of this invention shown in Figs. 1 and 2, the advantages and utility thereof are believed to be apparent. For the purpose of illustrating the functioning of the box, it first may be assumed that the cover has been removed from the box and that the box contains a considerable amount of powder 18 which is of light character which tends to fly about in the air. When the bottom of the side wall of the cover is placed in contact with the upper end of the wall of the container, it is free to slide down because air can readily escape through the filtering medium 15 between the layers 12 and 14, as indicated by the arrows in Fig. 2. This greatly facilitates the putting of the cover in place as compared with prior devices. Many prior devices can be closed but, due to the air pressure built up therein, tend to automatically partially reopen. Any such difficulty is obviated according to this invention. However, it is of primary importance according to this invention that any powder within the box which may have been disturbed in putting the cover in position and which would normally be contained in air escaping from the box is entangled in the filtering medium so that it does not escape from the box and fly about the room. When it is desired to use the powder, the cover can be removed readily. Due to the means provided for movement of air, removal of the cover does not create a vacuum within the box, which vacuum if created and suddenly released would tend to cause the powder to fly about. The flow of air through the filtering medium 15 into the box as the cover is removed has the additional advantage of tending to cleanse the filter and to prevent it from becoming clogged with powder.

Figure 3:
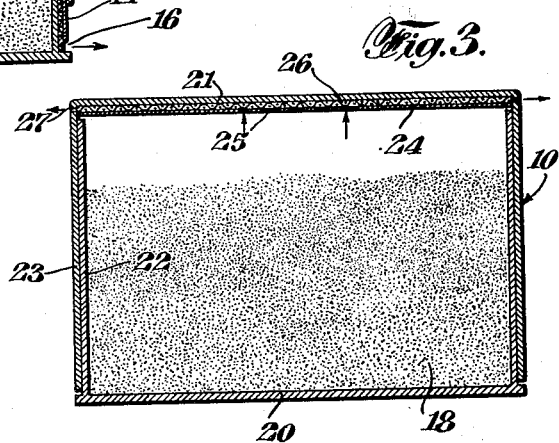
Figure 3 is a side cross-sectional view of an alternative form of powder box embodying this invention.

A modified form of powder box embodying this invention is shown in Fig. 3. In this modification, the powder box 10 includes a container 20 and a cover 21. The container has the upstanding side wall 22 and the cover 21 has the downwardly extending side wall 23. These side walls are longitudinally slidable in telescopic relation with respect to each other in the manner hereinabove mentioned. In this embodiment of this invention, the cover includes an inner layer 24 of sheet material which has perforations 25 therein. Between this inner layer 24 and the outer layer of the cover is disposed a filtering medium 26 which may be similar to the filtering medium 15 hereinabove described in connection with Fig. 2. At the margin of the cover 21 are perforations 27, which afford communication between the filtering medium 26 and the exterior of the box. The inner layer 24 of sheet material is flush with the side wall 23 of the cover so that a passage is afforded which at perforations 25 communicates with the interior of the box and at perforations 27 communicates with the exterior of the box. In this passage is disposed the filtering medium 26 which is adapted to entangle powder thereon while permitting movement of air therethrough. The faces of the filtering medium may be bonded to the cover 21 and layer 24 by some suitable adhesive.

The operation of the embodiment shown in Fig. 3 is believed to be apparent. When the cover is placed on the powder box, air will pass through the perforations 25, through the filtering medium 26, and out through the perforations 27. Any powder contained in this air will be entangled by the filtering medium 26. When the cover is removed, air will move in the reverse direction to that just mentioned.

Figure 4:
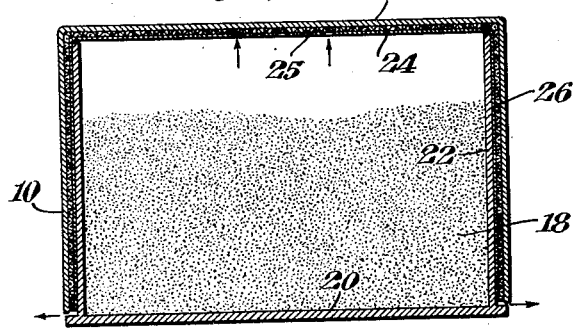
Figure 4 is a side cross-sectional view of an additional modified form of powder box embodying this invention.

In Fig. 4, an additional embodiment of this invention is illustrated. This embodiment is substantially identical with that shown in Fig. 3, and in so far as there is such identity the parts thereof have been indicated by similar reference characters to those given in Fig. 3. In this modification, however, the inner layer 24 of sheet material, instead of terminating adjacent the top of the cover, is brought all the way down the side wall of the cover so as to terminate near the bottom thereof. The filtering medium 26 is likewise brought down to the bottom of the cover 21 and is exposed to the outside air at the bottom of the side wall of the cover. In this construction, passage means between perforations 25 and the lower end of the filtering material 26 is afforded, and in the manner aforesaid the filtering material 26 which is within the passage serves to entangle powder thereon so that powder cannot escape from the box.

A powder box embodying this invention removes the difficulties hereinabove mentioned which have existed heretofore in connection with such articles. Spillage of powder from the box because of the setting up of air currents is entirely prevented. Moreover, due to the venting of the air, the manipulation of the cover in both taking it off and placing it back on is greatly facilitated. In this manner, the tightness of the box in those parts where there is no air filter can be increased so as to prevent any escape of powder from the box at such points. The venting of the air from the box is, however, controlled so that, while it can take place readily, it takes place only through a filtering medium which is adapted to entangle powder thereon.

While this invention has been described in connection with certain illustrated embodiments thereof, it is to be understood that this has been done merely for the purpose of affording specific illustrations thereof, and that this invention is not to be limited to the specific forms herein described. Thus a powder box embodying this invention may be square, polygonal, and the like, instead of being cylindrical. Moreover, passage means containing a filtering medium which is adapted to entangle powder thereon may be of other constructions than those shown and described herein for purposes of illustration. The scope of this invention is limited only by the language of the following claims.

We claim:

1. A powder box which comprises a container and a cover, said container and cover having longitudinally slidable telescoping walls and said box including a passage communicating between the outside of said box and the interior thereof affording a vent adapted for the movement of air therethrough in and out of said box upon removing and replacing said cover and a filtering medium disposed in said passage adapted to entangle powder thereon while permitting the movement of air through said passage, said filtering medium comprising a multiplicity of loosely disposed fibers and affording little obstruction to the passage of air therethrough so that said cover can be removed from the box and replaced easily and quickly and so as to prevent building up of either a vacuum or a state of compression within the box when said cover is thus removed or replaced.

2. A powder box which comprises a container and a cover, said container and cover having longitudinally slidable telescoping walls and the wall of said container including passage means having fixed walls and having one end in the interior of said box adjacent the top of said wall and another end on the exterior of said box adjacent the bottom of said wall and a filtering medium disposed in said passage between the ends thereof adapted to entangle powder thereon while permitting the movement of air through said passage.

3. A powder box which comprises a container and a cover, said container and cover having longitudinally slidable telescoping walls, and the wall of said container including an outer layer of sheet material and an inner layer of sheet material spaced from said outer layer by a porous filtering medium adapted to entangle powder thereon while permitting the movement of air therethrough and adapted to afford passage means between said inner and outer layers affording communication for the passage of air between the interior and exterior of said box.

4. A powder box which comprises a container and a cover, said container and cover having longitudinally slidable telescoping walls and said cover including passage means having one end in the interior of said box and another end on the exterior of said box and a filtering medium disposed in said passage between the ends thereof adapted to entangle powder thereon while permitting movement of air through said passage.

5. A powder box which comprises a container and a cover, said container and cover having longitudinally slidable telescoping walls and said cover including an outer layer of sheet material and an inner layer of sheet material spaced from said outer layer by a filtering medium adapted to entangle powder thereon while permitting the movement of air therethrough and adapted to afford passage means between said inner and outer layers affording communication for the movement of air between the interior and exterior of said box.

6. A powder box which comprises a container and a cover, said container and cover having longitudinally slidable telescoping walls and said box including a passage communicating between the outside of said box and the interior thereof affording a vent adapted for the movement of air therethrough in and out of said box upon removing and replacing said cover and a filtering medium disposed in said passage adapted to entangle powder thereon while permitting the movement of air through said passage, said passage being between two relatively immovable wall members of a double wall forming part of said box.

7. A powder box which comprises a container and a cover, said container and cover having longitudinally slidable telescoping walls and said box including a passage having fixed walls and communicating between the outside of said box and the interior thereof affording a vent adapted for the movement of air therethrough in and out of said box upon removing and replacing said cover and a filtering medium disposed in said passage adapted to entangle powder thereon while permitting the movement of air through said passage.

HORACE M. CARTER.
WALTER LANGER.